US012699592B2

(12) United States Patent
Poehnl et al.

(10) Patent No.: US 12,699,592 B2
(45) Date of Patent: Aug. 4, 2026

(54) METHOD, DATA PROCESSING MODULE, AND DATA PROCESSING NETWORK FOR DUAL-CONDITION CONTROLLED TRIGGERING FOR PROCESSING DATA

(71) Applicant: Robert Bosch GmbH, Stuttgart (DE)

(72) Inventors: Michael Poehnl, Wurmberg (DE); Raphael Diziol, Kandel (DE); Stefan Egenter, Freiburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 460 days.

(21) Appl. No.: 18/044,515

(22) PCT Filed: Sep. 16, 2021

(86) PCT No.: PCT/EP2021/075423
§ 371 (c)(1),
(2) Date: Mar. 8, 2023

(87) PCT Pub. No.: WO2022/063663
PCT Pub. Date: Mar. 31, 2022

(65) Prior Publication Data
US 2023/0333891 A1 Oct. 19, 2023

(30) Foreign Application Priority Data
Sep. 24, 2020 (DE) ..................... 10 2020 212 035.8

(51) Int. Cl.
*G06F 9/46* (2006.01)
*G06F 9/48* (2006.01)
(52) U.S. Cl.
CPC .................................. *G06F 9/4887* (2013.01)
(58) Field of Classification Search
CPC .................................................... G06F 9/4887
See application file for complete search history.

(56) References Cited

U.S. PATENT DOCUMENTS

| | | | |
|---|---|---|---|
| 2017/0060622 A1 | 3/2017 | Haughwout et al. | |
| 2019/0004528 A1 | 1/2019 | Zhan et al. | |
| 2019/0155648 A1* | 5/2019 | Knowles ............... | G06F 9/4881 |

FOREIGN PATENT DOCUMENTS

| | | |
|---|---|---|
| CN | 109213143 A | 1/2019 |
| CN | 109213609 A | 1/2019 |
| WO | 2020092635 A1 | 5/2020 |

OTHER PUBLICATIONS

International Search Report for PCT/EP2021/075423, Issued Jan. 19, 2022.

* cited by examiner

*Primary Examiner* — Gregory A Kessler
(74) *Attorney, Agent, or Firm* — NORTON ROSE FULBRIGHT US LLP

(57) ABSTRACT

A method for processing data with a data processing network including a plurality of data processing modules which each include at least one data processing component, each data processing component being designed for a defined data processing task for processing the data, each data processing module receiving, as input data, data from a data source and/or output data from further data processing modules and generating output data which is network output data of the data processing network and/or input data of further data processing modules. The method for at least one data processing module including: a) receiving a set of input data for performing the data processing tasks; b) receiving a stimulus for activating the at least one data processing component; c) performing the data processing task with the corresponding input data to generate output data; and d) providing the output data.

15 Claims, 4 Drawing Sheets a) b)                    c)                    d) e)

a) b)                    c)                    d) e)

METHOD, DATA PROCESSING MODULE, AND DATA PROCESSING NETWORK FOR DUAL-CONDITION CONTROLLED TRIGGERING FOR PROCESSING DATA

BACKGROUND INFORMATION

Driver assistance or automated driving systems are comprised of many individual software units, which, with respect to data flow, may typically be described with graphs. These software units (often also called runnables, nodes, or data processing components) are characterized by an amount of input data being processed and an amount of output data being generated therefrom.

In the aforementioned systems, input data from sensors, such as radar or video, is processed in a graph of data processing components that visualizes the data flow in a static view.

The various software units regularly form a complex data processing network with which sensor data are processed to perform actions based on the sensor data, wherein such actions may, for example, be control tasks in the context of autonomously operating a vehicle. The data processing in the data processing network typically includes a plurality of interdependent data processing steps or data processing tasks performed with the data processing components.

The execution of a data processing task in such a data processing network is dependent on a corresponding condition which may include stimuli, such as time steps or the arrival of data. The control flow that determines the execution of the data processing components is typically derived from the data flow.

There are data-driven approaches in which execution of the data processing components is driven by data flow. Moreover, there are approaches that apply a time-driven execution of the data processing components. This has been enriched in recent years with worst-case execution-time concepts (longest possible execution duration).

In a strictly data-driven approach, the execution of a data processing component is triggered by the arrival of a data packet. In a corresponding graph, sending data packets in the execution of a data processing component can result in immediate execution of a data processing component dependent thereon. Even a multiple parallel execution of a data processing component is possible if new data packets arrive while a data processing component is still being executed. Such a system has a low latency but a high number of possible states.

SUMMARY

According to the present invention, a method for data processing is provided, which has the goal of realizing reproducibility of data processing while at the same time providing high performance.

According to an example embodiment of the present invention, a method for processing data is provided, in particular for processing sensor data in a vehicle, with a data processing network comprising a plurality of data processing modules, which each comprise at least one data processing component, each data processing component being designed for a defined data processing task for processing the data, each data processing module receiving, as input data, data from a data source and/or output data from further data processing modules and generating output data which in turn is network output data of the data processing network and/or input data of further data processing modules, the following steps being performed in the method for at least one data processing module:

a) receiving a set of input data for performing the data processing tasks in the at least one data processing component of the respective data processing module;

b) receiving a stimulus for activating the at least one data processing component of the data processing module;

c) If the set of input data was received in step a) and the stimulus was received in step b): activating the at least one data processing component of the data processing module and performing the data processing task for which the data processing component is designed with the respective input data to generate output data; and d) providing the output data for further data processing and/or as network output data.

The method is intended to in particular solve the problem that predictability and reproducibility are very difficult to realize with a traditional approach. This makes it more difficult to implement safety measures, such as a SW lockstep, in which the same SW is executed simultaneously on two p-processors. It is also difficult to recalculate (recompute) a recorded driving situation as accurately as possible since a different runtime behavior and thus possibly a different result is to be expected.

According to an example embodiment of the present invention, a plurality of data processing components of a data processing network are in each case grouped together into so-called data processing modules, thereby creating an additional parent structure of the data processing network. At the level of this structure, input data and output data of each data processing component are aggregated within the module and the data flow is controlled or monitored by the data processing network at this level.

In the automotive industry with a high proportion of control technology, execution in time slices (e.g., 10 ms, 20 ms, 100 ms tasks) has always been dominant. However, in particular when using multi-core systems as hardware to perform the data processing with such data processing networks, additional problems arise. In particular on multi-core systems, fluctuating runtimes of the data processing components of a data processing network occur. As a result of such fluctuating runtimes, assigning output data of a data processing component as input data of further data processing components is made more difficult or is no longer predictable. This predictability may be improved again, for example, with maximum possible execution/processing-time concepts. However, such concepts degrade the utilization capacity of the hardware (of the multi-core system). The hardware must be sized significantly larger.

In particular, as a result of applications of highly complex driver assistance or in applications of automated driving, the amount of sensor data to be processed increases drastically. However, the required response time of such systems is comparable or even lower than in traditional driver assistance applications. That is to say, more and more computationally intensive calculations must be performed in a longer processing chain in a comparable time period. This leads to unacceptable latency in the existing time-driven approaches since the additional latency from the transitions between the individual time slices is added up over the entire chain.

According to an example embodiment of the present invention, the method provided allows approaches from the data-driven execution to be combined with achievements of the time-driven execution of data processing components. Data processing networks can thus operate to experience lower latency (better performance capability) than in purely time-driven systems and better reproducibility than strictly data-driven systems. This allows the high requirements with respect to latency in a system for automated driving to be met while having a system that allows execution in the SW lockstep and exact reproducibility in the recompute. For step b), a suitable stimulus may be determined that defines the performance of the data processing in step c), wherein the input data received in step a) is then resorted to. With step d), the output data are then provided for subsequent processing steps. If the respective data processing module is the final data processing module in a data processing network, the data may then also be referred to as network output data or system output data, which simultaneously is, for example, input data of a controller that processes this data or considers it for an application.

As a result of the described method of the present invention, both time-driven and data-driven execution of the data processing tasks is possible. The actual start of the data processing takes place when the stimulus is received in step b). With the arrival of the stimulus, the data becomes somewhat visible to the data processing components. Time-related data structures are thus transmitted together between data processing modules. The provision of data to the data processing components takes place using the data processing modules provided in a parent structure. The structure of the parent data processing modules and the fact that the provision of data takes place at this level significantly reduce the number of system states of the entire data processing network.

According to an example embodiment of the present invention, it is particularly preferred if the following step is performed after step d):

e) providing a validation data set consisting of the set of input data, the stimulus, and/or the output data to validate the performance of the at least one data processing task with the at least one data processing component.

According to an example embodiment of the present invention, it is preferred if the validation data set additionally includes at least one piece of time information that allows a time of the stimulus and/or a piece of time information about the processing of the at least one data processing task.

Such time information may, for example, take place by recording start and end of executions of the data processing tasks. Thus, the processed input data and the generated output data may be represented on a common logical timeline and test calculations of the described method are enabled.

It is possible that a data processing module that processes output data of a further data processing module as input data starts processing when a stimulus occurs as activation. Compared to the time-driven approach, this avoids the additional latency as a result of WCET and up to the start of the time slice of the receiving data processing module.

The method described herein according to the present invention may achieve reproducibility of the performance of the individual data processing tasks because the information regarding the respectively processed input data is reproducible.

During an execution (performance of step c), a data processing module in the presented method always has a frozen view of the world or of the input data that is processed. The input data does not change during an execution of the method. This is achieved by collecting the incoming input data in step a), by being able to pass the data in a controlled manner and atomically in logical time. In order to process the output data of a data processing module consistently with respect to the execution thereof by other data processing modules, the output data are preferably also collected.

According to an example embodiment of the present invention, it is preferred if the stimulus used in step b) is generated using at least one timer that specifies a time grid for regularly repeating the performance of the data processing tasks with the data processing components.

For example, the timer may be a corresponding hardware module on which the data processing network operates and which, for each data processing module, regularly emits a timer signal that forms the stimulus and triggers the method to be performed.

In addition, according to an example embodiment of the present invention, it is preferred if the stimulus used in step b) is generated using at least one availability signal that indicates the availability of data. This availability signal may, for example, have been produced by a previous execution of the described method in another data processing module.

It is particularly preferred if the stimulus is formed from a combination of timer and availability signal. Every time new data are indicated via an availability signal, the data processing module is made ready to respond to the timer. Only if both the timer and the (at least one) availability signal indicate that data processing is to be started will the data processing take place in the data processing components of the respective data processing module (step c).

It is particularly preferred if step a) is performed with an input data reception module of the data processing module which comprises an input memory for buffering input data that is not yet complete and which performs a completeness check of the set of input data.

It is also preferred if step d) is performed with an output data provisioning module which comprises an output memory in which buffering of output data that is not yet complete takes place.

Preferably, the data processing module has special gates (input data reception module=input gate and output data provisioning module=output gate) to perform the data processing task.

Through these gates, a controlling unit can control the data flow between the data processing modules. If the controlling unit now synchronizes the start and end of executions of the data processing modules with passing of data through the gates, it can be controlled which data processing module is executed at what time with what data. In order to decide on starting a data processing module, the aforementioned stimulus is evaluated.

In execution variants of the present invention, output data provided in step d) is used at least in part as input data for re-performing method steps a) to d) (and possibly also step e) with the same data processing module.

This describes a type of feedback that allows a data processing module to process historical data from a previous execution of a data processing module. Such feedback enables a certain type of capacity for remembering in a data processing network.

If feedback within the computing steps of a data processing module occurs, this data path is designed to be realized via the respective input data reception module and the respective output data reception module of the data processing module.

According to an example embodiment of the present invention, it is preferred if output data provided in step d) comprises data subsets generated by various data processing components of the data processing module during the performance of the data processing tasks, provision of the output data in step d) only taking place when all data subsets forming the output data are available.

For example, data subsets are created because the data processing tasks of various data processing components within the data processing module have different processing times. By collecting the data subsets until the output data are fully available and by providing all data subsets together, it is significantly easier to understand when what data was available during data processing with the data processing network.

According to an example embodiment of the present invention, it is also preferred if in step d), an availability signal is additionally generated from which it can be seen that output data has been provided for further processing.

As already described above, such an availability signal may serve as a stimulus for further executions of the described method.

According to an example embodiment if the present invention, it is also preferred if, during the performance of the method, permanent recording of at least one of the following pieces of information takes place for later further processing:

sets of input data received in step a);
    stimuli received in step b);
    output data provided in step d); and
    output data provided in step d).

It is particularly preferred if during the recording, storing of the time information additionally takes place, which allows the time assignment of the method performance to a timeline.

Such recording can, for example, take place in an additional debug data store in order to subsequently perform debug tasks in which, if necessary, errors in the individual data processing components can be investigated. Such recording can also be used in a finished system in use in order to detect hardware-related errors, in particular, in the execution of the data processing tasks by means of a subsequent investigation and to then perform corrective tasks.

Also described herein is a data processing module for a data processing network for performing the described method of the present invention. According to an example embodiment of the present invention, the data processing module comprises an input data reception module to which is assigned an input memory, and an output data provisioning module to which is assigned an output memory, as well as furthermore comprising at least one data processing component for performing a data processing task based on the input data in the input memory and for generating output data for storage in the output memory.

Moreover, a data processing network comprising a plurality of such data processing modules is provided according to an example embodiment of the present invention.

The explanations on the method provided above can be transferred and applied to the data processing module and the data processing network.

The process is explained in greater detail below with reference to the figures.

DETAILED DESCRIPTION OF EXAMPLE EMBODIMENTS

Figure 1:
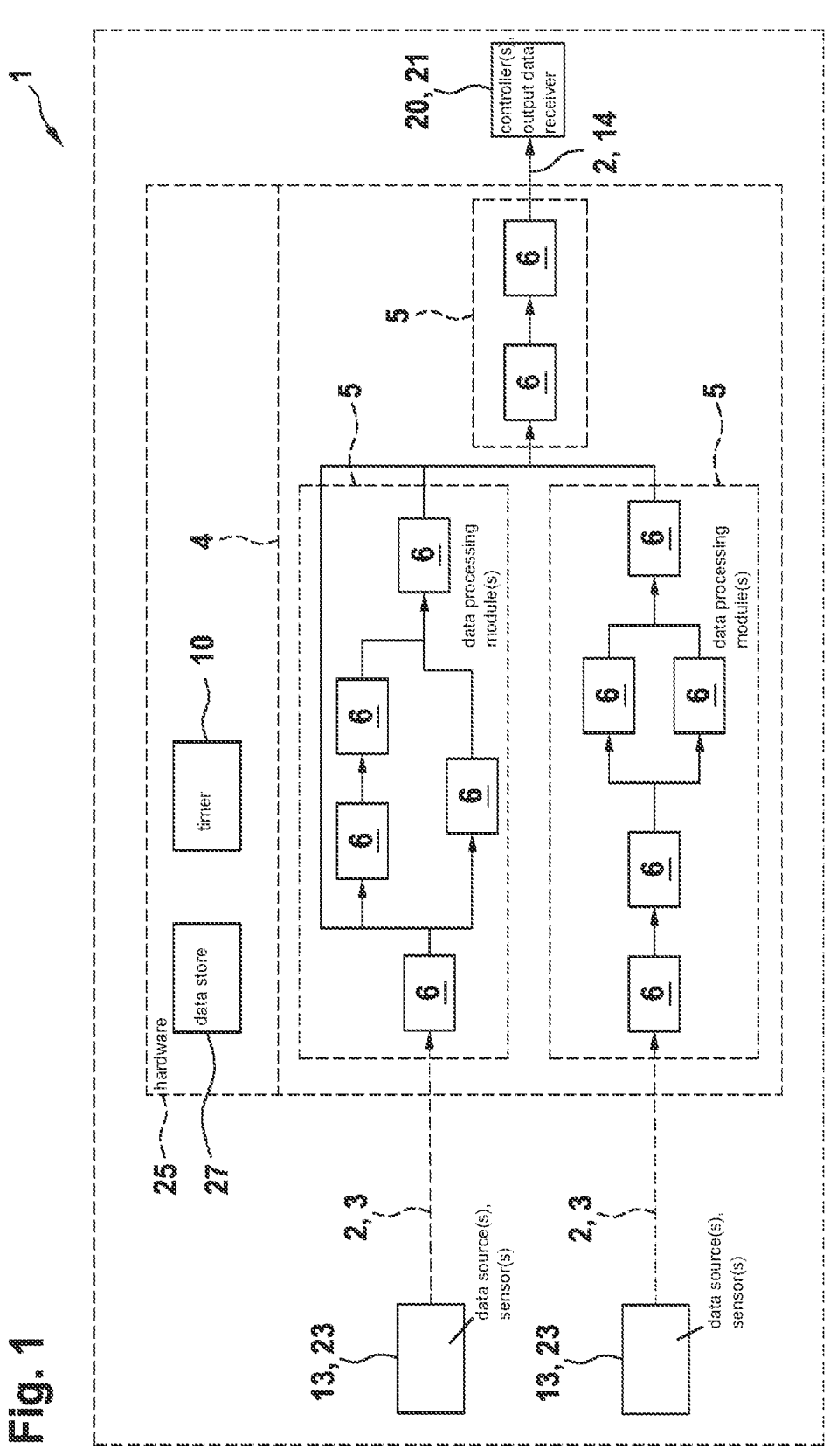
FIG. 1 shows a vehicle in which a described data processing network of the present invention is used and in which the described method of the present invention is applied.

A vehicle 1 is schematically shown in FIG. 1. The vehicle 1 is in particular a road vehicle, for example a passenger vehicle or a truck. The vehicle 1 has sensors 23 for capturing information, such as environmental data from the environment of the vehicle 1, which can be utilized by various driver assistance systems. Such systems may, for example, be active or passive safety systems, or also systems for autonomous (or semi-autonomous) driving operation. Such systems are shown as a controller 20 in FIG. 1.

In order for the controller 20 to process the data of the sensors 23, this data must be prepared. For this purpose, the vehicle 1 comprises a data processing network 4. The sensors 23 form data sources 13 for this data processing network 4, said data sources providing sensor data 3 to the data processing network 4. The controller 20 forms an output data receiver 21 for this data processing network 4, said output data receiver receiving network output data 14 of the data processing network 4.

The data processing network 4 consists of a plurality of data processing modules 5, each consisting of (one or more) data processing components 6. The data processing network 4 with the data processing modules 5 and the data processing components 6 is preferably realized on hardware 25 which in particular comprises a data store 27 in which the data processing network 4 can store data 2 and which can also provide various other hardware functions, for example a timer 10, for the data processing network 4.

Figure 2:
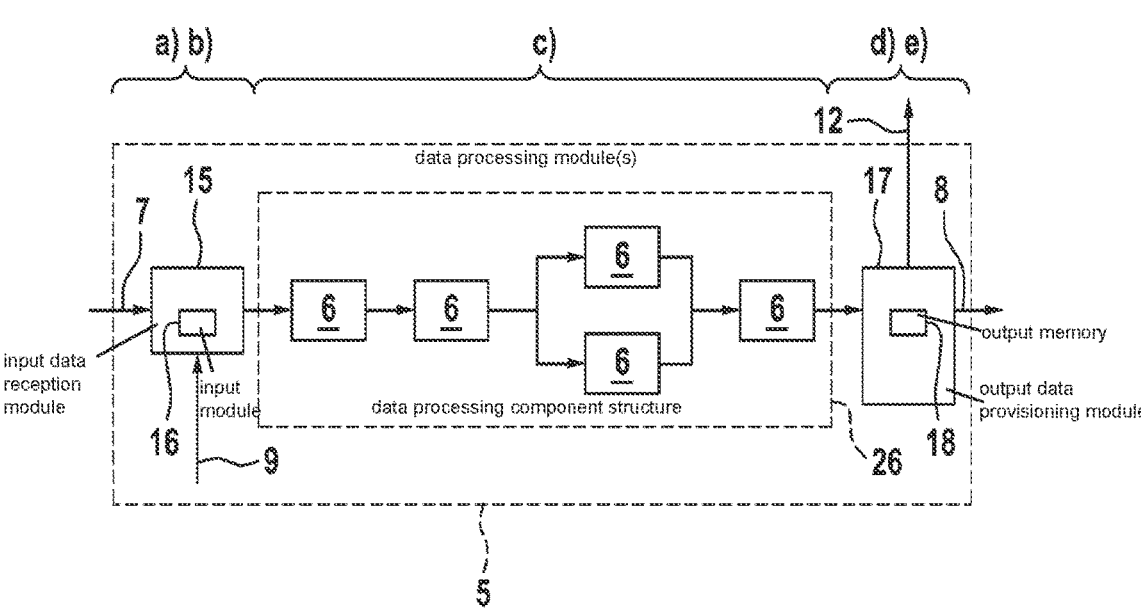
FIG. 2 shows a data processing module for performing the described method according to an example embodiment of the present invention.
Figure 3:
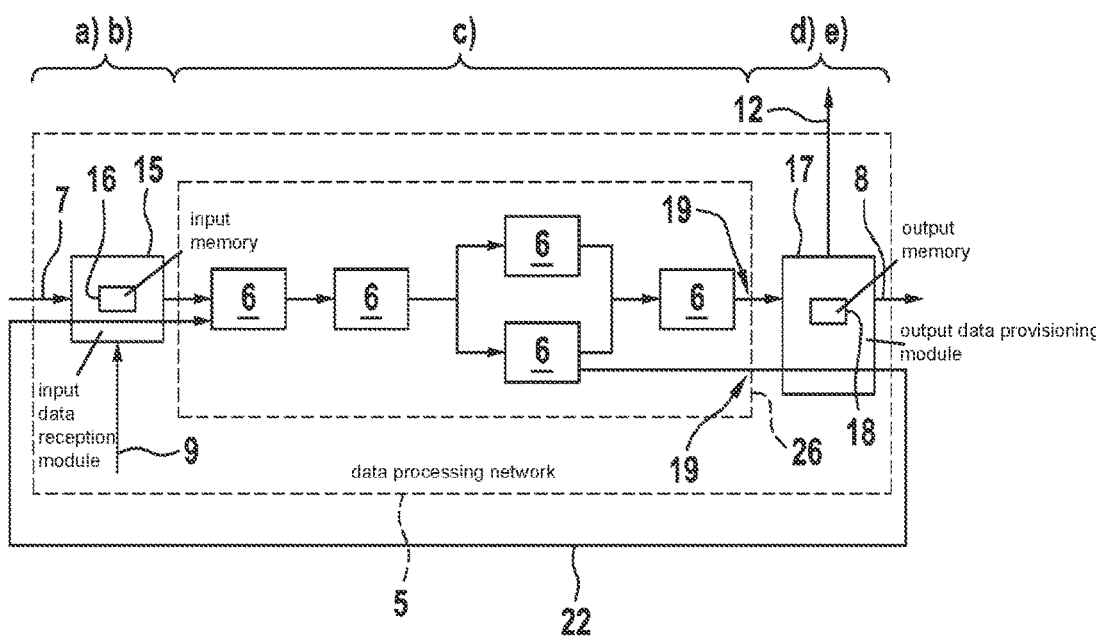
FIG. 3 shows a further embodiment variant of a data processing module for performing the described method according to an example embodiment of the present invention.

Various embodiment variants of data processing modules 5 for the described data processing network 4 are shown in FIGS. 2 and 3. The described method is in each case performed at the level of each individual data processing module 5. Each data processing module 5 has an input data reception module 15 comprising an input memory 16 for receiving input data 7, and an output data provisioning module 17 comprising an output memory 18 for providing output data 8, as well as a data processing component structure 26 comprising data processing components 6 for processing data from the input data 7 to the output data 8. The input data reception module 15 may comprise an interface for receiving a stimulus 9 with which data processing with the data processing components 6 may be initiated. The output data provisioning module 17 may have an interface for emitting an availability signal 12 when data processing with the data processing components 6 is completed and the output data 8 is available.

The method steps a) and b) of the described method relate to the reception of the input data 7 and are predominantly performed with the input data reception module 15. The method steps d) and e) of the described method relate to the provision of the output data 8 and are predominantly performed with the output data provisioning module 17. The actual data processing occurs in step c) in the data processing components 6, which form a data processing component structure 26 of the respective data processing module 5.

The embodiment variant of the data processing module 5 according to FIG. 3 comprises a feedback 22 as a special feature. By way of example, FIG. 1 shows a data processing network 4 that ultimately processes the data from the data source 13 immediately deterministically and without feedback from the data source 13 (here the sensors 23) to the output data receiver 21 (the controller 20). This is also sufficient for many applications. However, the feedback 22 shown in FIG. 3 also shows how non-immediately deterministic data processing can be enabled in data processing networks 4 having such a structure, namely by such feedback 22. Output data 8 may be routed back to the input data reception module 15 of the same data processing module 5 via such feedback 22 in order to then process it in subsequent data processing with the data processing components 6 of the data processing module 5. Thus, the data processing network 4 may be taught a capacity for remembering data. In the embodiment variant according to FIG. 3, it is shown as a still further special feature that the output data 8 consists of data subsets 19 that are available at different times during the data processing with the data processing components 6. The output data provisioning module 17 may be designed to emit the availability signal 12 for all of the output data 8 (data subsets 19) as a whole.

Figure 4:
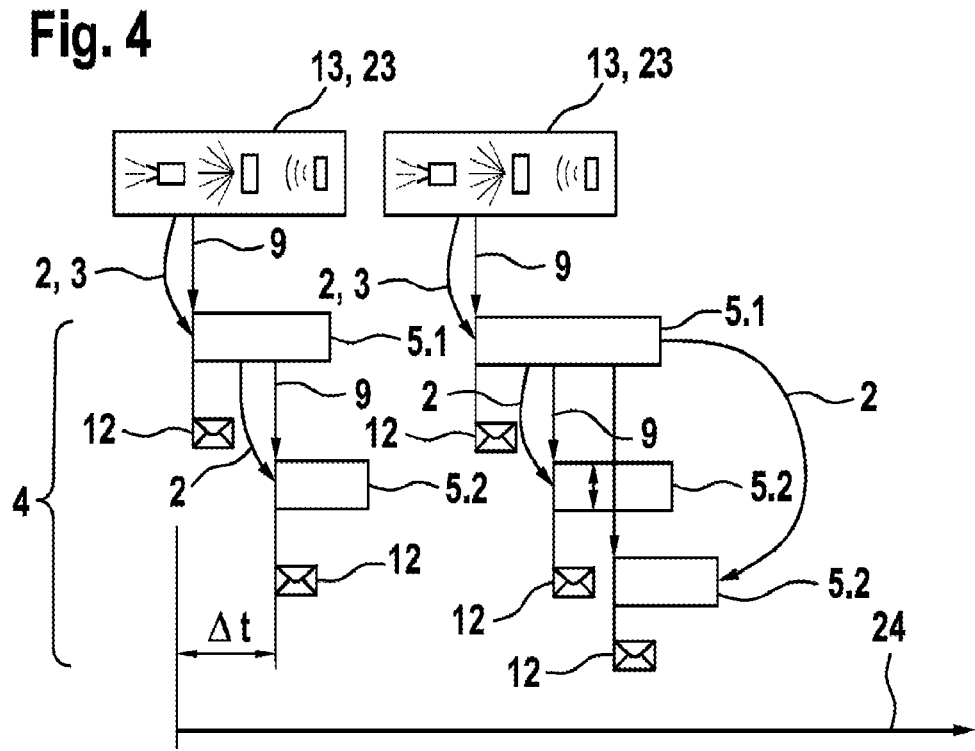
FIG. 4 shows a type of data processing using a method described according to an example embodiment of the present invention, shown on a timeline.
Figure 5:
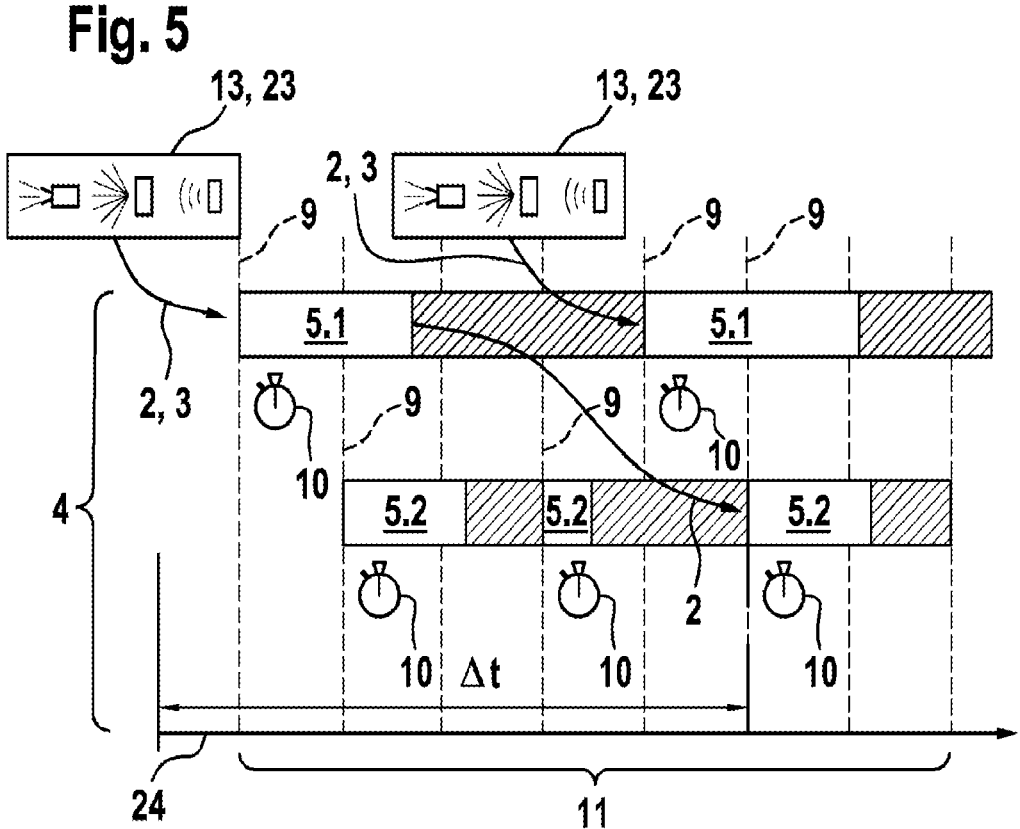
FIG. 5 shows a further type of data processing using a method described according to an example embodiment of the present invention, shown on a timeline.
Figure 6:
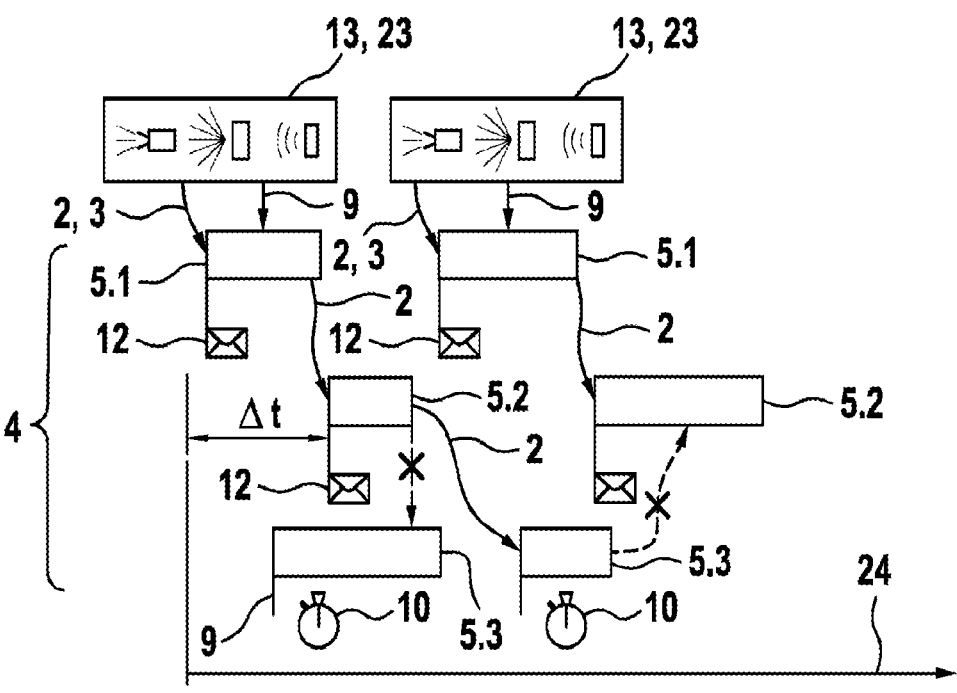
FIG. 6 shows yet a further type of data processing using a method described according to an example embodiment of the present invention, shown on a timeline.

FIGS. 4, 5, and 6 show various ways of processing data that may be performed with the described data processing network 4, or with the described method.

The representations each show different data processing modules 5.1, 5.2 and/or 5.3, the duration of execution of the data processing with the respective data processing components 6 belonging to the data processing modules 5 being plotted as a bar on the timeline 24 in each case. Shown schematically at the top are in each case the data sources 13 (here sensors 23 in each case) with which data 2 (here sensor data 3) can be introduced into the data processing network 4.

The individual data processing modules 5.1, 5.2 and/or 5.3 are shown successively several times across the timeline 24. It is thereby shown that the individual data processing modules 5.1, 5.2 and/or 5.3 are each executed repeatedly several times, resorting to different input data in each case. The start of execution of one of the data processing modules 5.1, 5.2 and/or 5.3 respectively takes place when a stimulus 9 is present.

FIGS. 4, 5 and 6 each show different types of stimuli 9 that may be used herein.

FIG. 4 shows that only availability signals 12 indicating an availability of data for performing particular data processing tasks with data processing modules 5.1, 5.2 and/or 5.3 are used as stimuli 9. The method shown in FIG. 4 runs in a rather uncontrolled manner in terms of data technology. As soon as new data are available, execution of the respective data processing modules 5.1, 5.2 and/or 5.3 starts. A high processing speed is thereby realized. However, there is also a greatly reduced comprehensibility as to which data was processed by the respective data processing module 5.1, 5.2 and/or 5.3. This is particularly true because the duration of the data processing with the data processing modules 5.1, 5.2 and/or 5.3 cannot be accurately predicted and there is thus no or only low reproducibility as to which data processing module 5.1, 5.2 and/or 5.3 reacts to what input data. The term "reproducibility" here means reproducibility of the data processing with the data processing network 4. In this context, low reproducibility means that a very high amount of effort must be made to understand the data processing with the individual data processing modules 5.1, 5.2 and/or 5.3, as is required, for example, for debugging tasks or for tasks to ensure the accuracy of data processing in redundant systems.

FIG. 5 shows that signals of a timer 10 following a fixed time grid 11 are respectively used as stimuli 9. Such stimuli 9 for triggering data processing with the data processing modules 5.1, 5.2 and/or 5.3 can achieve that it is always precisely known with which input data the data processing with the data processing modules 5.1, 5.2 and/or 5.3 starts. This achieves high reproducibility in the above-mentioned sense; however, at the same time, the performance capability of the data processing network 4 is drastically reduced. The performance capability of the data processing network 4 here refers to the ability of the data processing network 4 to operate with as little hardware resources as possible. Because it must be ensured in each case that the data processing with a data processing module (e.g., data processing module 5.1) is completed before a further data processing module is started, which processes output data 8 of the first data processing module as input data (e.g., data processing module 5.2). Because the duration of the data processing with the data processing modules 5.1, 5.2 and/or 5.3 cannot be accurately predicted, the time grid must be dimensioned sufficiently based on a longest possible execution duration.

The embodiment variants according to FIG. 6 combine aspects of the embodiment variants according to FIGS. 4 and 5 in order to achieve high reproducibility on the one hand and good performance capability on the other hand. Depending on the task, the data processing network 4 operates with availability signals 12 or with timers 10 as stimulus 9.

The invention claimed is:

1. A method for processing data in a vehicle with a data processing network, the data being sensor data, the data processing network including a plurality of data processing modules, each data processing module having a respective input data reception module with a respective input memory and a respective output data provisioning module, each data processing module further including at least one data processing component, each of the data processing components being configured for defined data processing tasks for processing the data, each of the data processing modules being configured to receive, as input data, data from a data source and/or output data from further ones of the data processing modules and to generate output data which are network output data of the data processing network and/or input data of further ones of the data processing modules, the method comprising the following steps for at least one individual one of the data processing modules:

a) receiving, by the respective input data reception module of the data processing module and into the respective input memory of the data processing module, a set of input data for performing the data processing tasks, the receiving including collecting incoming input data in the respective input memory until the set of input data is complete;

b) receiving a trigger control signal, wherein generation and issuance of the trigger control signal do not occur automatically upon, and are not coincident with, a time at which the set of input data of step a) first became available as complete, the trigger control signal being an activating signal for activating the at least one data processing component of the data processing module;

c) in an instance where step b) occurs with a delay after completion of step a), during a time period after the completion of step a) and before receipt of the trigger control signal in step b), maintaining the at least one data processing component in an inactive state, and only responsive to subsequent receipt of the trigger control signal after completion of step a), activating the at least one data processing component of the data processing module and performing the data processing tasks for which the data processing component is configured using the set of input data stored in the respective input memory to generate the output data, wherein the set of input data used in performing the data processing tasks does not change during the performing of the data processing tasks; and d) providing the generated output data for further data processing and/or as network output data.

2. The method according to claim 1, wherein the following step is performed after step d):

e) providing a validation data set including the set of input data and/or the trigger control signal and/or the output data to validate the performance of the processing tasks with the at least one data processing component.

3. The method according to claim 2, wherein the validation data set additionally includes at least one piece of time information that allows a time of the trigger control signal and/or a piece of time information about processing of the data processing tasks.

4. The method according to claim 1, wherein the trigger control signal of step b) is generated by a timer that specifies a time grid for regularly repeating the performance of the data processing tasks with the data processing components.

5. The method according to claim 1, wherein the trigger control signal of step b) is generated based on an availability condition indicating availability of data in the data processing network.

6. The method according to claim 1, wherein the input data reception module of the data processing module performs a completeness check of the set of input data, which is buffered in the input memory as portions of the input data become available.

7. The method according to claim 1, wherein step d) is performed with the respective output data provisioning module, portions of the output data being buffered in the output memory as the portions of the output data, which is not yet complete, becomes available.

8. The method according to claim 1, wherein the output data provided in step d) are used at least in part as input data for re-performing method steps a) to d) with the same data processing module.

9. The method according to claim 1, wherein the output data provided in step d) include data subsets generated by various ones of the data processing components of the data processing module during the performance of the data processing task, the providing of the output data in step d) taking place only when all data subsets forming the output data are available.

10. The method according to claim 1, wherein in step d), an availability signal is additionally generated from which it can be seen that the output data have been provided for further processing.

11. The method according to claim 10, wherein during the performance of the method, permanent recording of at least one of the following pieces of information takes place for later further processing:

sets of input data received in step a);

trigger control signals received in step b);

the output data provided in step d); and availability signals provided in step d).

12. The method according to claim 11, wherein during the recording, storing of time information additionally takes place, which allows a time assignment of the method performance to a timeline.

13. The method according to claim 1, wherein:

the trigger control signal of step b) includes two control signals, (I) a first one of which is generated by a timer that specifies a time grid for regularly repeating the performance of the data processing tasks with the data processing components, and (I) a second one of which is generated based on an availability condition indicating availability of data in the data processing network; and the activating is performed conditional upon satisfaction of a dual condition of receiving both of the two control signals.

14. A data processing module, which is one of a plurality of data processing modules of a data processing network, the data processing module comprising:

an input data reception module, which is one of a plurality of input data reception modules that (a) are each respectively of a respective individual one of the plurality of data processing modules and (b) each includes a respective input memory;

an output data provisioning module, which is one of a plurality of output data provisioning modules that are each respectively assigned a respective output memory; and at least one data processing component configured to perform a data processing task based on input data in the input memory and to output data for storage in the output memory;

wherein the data processing module is configured to:

a) receive, by the respective input data reception module of the data processing module and into the respective input memory of the data processing module, a set of input data for performing the data processing tasks, the receiving including collecting incoming input data in the respective input memory until the set of input data is complete;

b) receive a trigger control signal, wherein that is generation and issuance of the trigger control signal do not occur automatically upon, and are not coincident with, a time at which the set of input data of step a) first became available as complete, the trigger control signal being an activating signal for activating the at least one data processing component of the data processing module;

c) in an instance where step b) occurs with a delay after completion of step a), during a time period after the completion of step a) and before receipt of the trigger control signal in step b), maintain the at least one data processing component in an inactive state, and only responsive to subsequent receipt of the trigger control signal after completion of step a), activate the at least one data processing component of the data processing module and perform the data processing tasks for which the data processing component is configured using the set of input data stored in the respective input memory to generate the output data, wherein the set of input data used in performing the data processing tasks does not change during the performing of the data processing tasks; and d) provide the generated output data for further data processing and/or as network output data.

15. A data processing network, comprising:

a plurality of data processing modules, each data processing module of the data processing modules including:

a respectively assigned one of a plurality of input data reception modules that each includes a respective one of a plurality of input memories;

a respective output data provisioning module to which is assigned a respective output memory; and at least one data processing component configured to perform a data processing task based on input data in the input memory and to generate output data for storage in the output memory;

wherein the data processing module is configured to:

a) receive, by the respective input data reception module of the data processing module and into the respective input memory of the data processing module, a set of input data for performing the data processing tasks, the receiving including collecting incoming input data in the respective input memory until the set of input data is complete;

b) receive a trigger control signal, wherein generation and issuance of the trigger control signal do not occur automatically upon, and are not coincident with, a time at which the set of input data of step a) first became available as complete, the trigger control signal being an activating signal for activating the at least one data processing component of the data processing module;

c) in an instance where step b) occurs with a delay after completion of step a), during a time period after the completion of step a) and before receipt of the trigger control signal in step b), maintain the at least one data processing component in an inactive state, and only responsive to subsequent receipt of the trigger control signal after completion of step a), activate the at least one data processing component of the data processing module and perform the data processing tasks for which the data processing component is configured using the set of input data stored in the respective input memory to generate the output data, wherein the set of input data used in performing the data processing tasks does not change during the performing of the data processing tasks; and d) provide the generated output data for further data processing and/or as network output data.

* * * * *